S. I. SHEPPARD & A. MUNRO.
VEHICLE WHEEL.
APPLICATION FILED MAY 22, 1915.
1,166,013.
Patented Dec. 28, 1915.
2 SHEETS—SHEET 1.
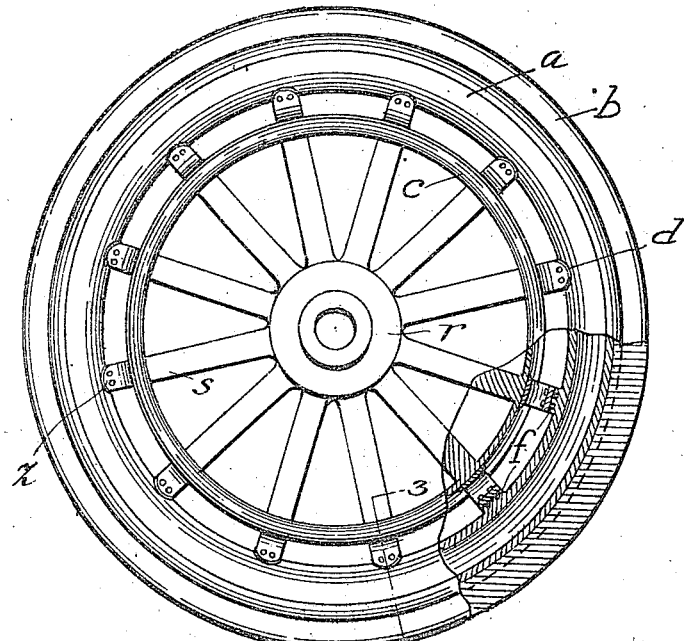
FIG. 1
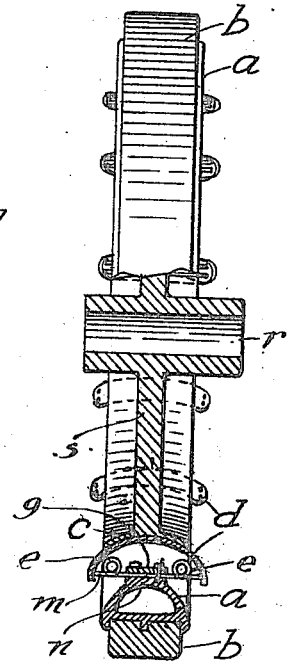
FIG. 2
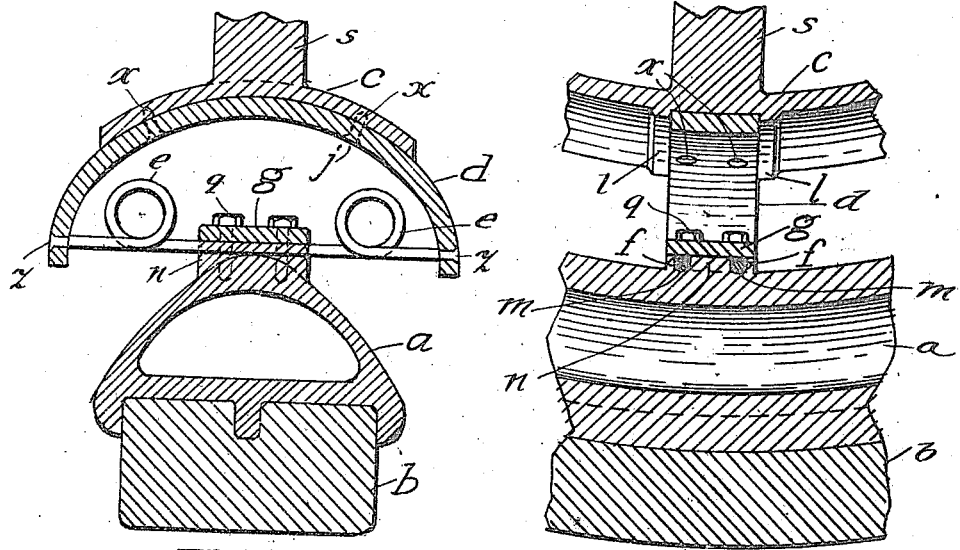
FIG. 3
FIG. 4
Inventors,
Samuel T. Sheppard.
Archibald Munro, inventors
Witnesses S. T. SHEPPARD & A. MUNRO.
VEHICLE WHEEL.
APPLICATION FILED MAY 22, 1915.
1,166,013.
Patented Dec. 28, 1915.
2 SHEETS—SHEET 2.
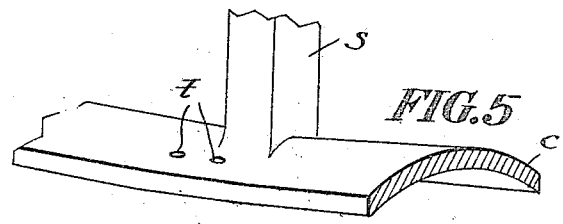
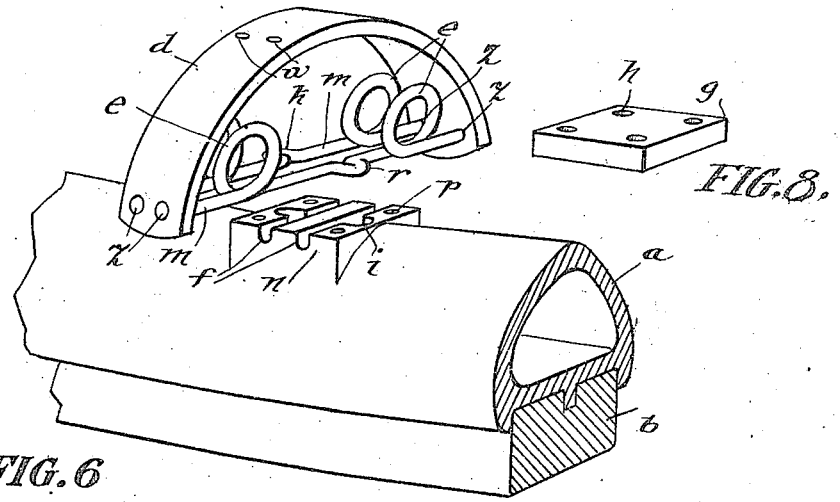
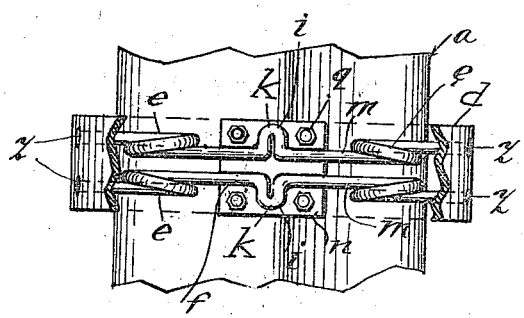
Witnesses
Samuel T. Sheppard and
Archibald Munro
Inventors

UNITED STATES PATENT OFFICE.

SAMUEL T. SHEPPARD AND ARCHIBALD MUNRO, OF GARDEN CITY, MINNESOTA; SAID MUNRO ASSIGNOR TO SAID SHEPPARD.

VEHICLE-WHEEL.

1,166,013.   Specification of Letters Patent.   Patented Dec. 28, 1915.

Application filed May 22, 1915. Serial No. 29,943.

*To all whom it may concern:*

Be it known that we, SAMUEL T. SHEPPARD and ARCHIBALD MUNRO, citizens of the United States, residing at Garden City, in the county of Blue Earth, State of Minnesota, have invented a new and useful Vehicle-Wheel, of which the following is a specification.

The device forming the subject matter of this application is a wheel adapted to be used upon automobiles and other vehicles.

The invention aims to provide novel means for effecting a resilient connection between the inner rim and the outer rim of the wheel and, specifically, the invention aims to improve the bracket and spring elements whereby an operative connection is afforded between the parts above alluded to.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings:—Figure 1 shows in side elevation, a wheel embodying the present invention, parts being broken away and sectioned; Fig. 2 is an elevation wherein the wheel is viewed edgewise, parts appearing in section; Fig. 3 is a section taken on the line 3—3 of Fig. 1; Fig. 4 is a fragmental circumferential section of the wheel, distant parts of the springs being omitted; Fig. 5 is a fragmental perspective showing a portion of the inner rim; Fig. 6 is a fragmental perspective showing the outer rim and one of the brackets, the rim and the bracket being spaced apart; Fig. 7 is a plan, looking at the inner curve of the outer rim, the bracket being broken away, and the spring holding cap being removed; Fig. 8 is a perspective showing the spring holding cap.

In the accompanying drawings the letter $r$ designates a hub from which radiate spokes $s$ supporting an inner rim $c$, shown in the drawings as of trough shape. As shown best in Fig. 4, the inner rim $c$ is provided at intervals with transverse ribs $l$ located on the concaved face of the inner rim and preferably disposed upon each side of the spokes $s$. As shown in Fig. 5, the inner rim $c$ is provided with a plurality of openings $t$. Seated on the inner rim $c$ and held against movement circumferentially of the rim by means of the ribs $l$ are curved or arched brackets $d$, shaped as shown at $j$ to conform to the transverse curve of the inner rim $c$. In the brackets $d$ are formed openings $w$ adapted to line up with the openings $t$ in the inner rim $c$. Securing elements $x$ mounted in the openings $w$ and $t$ serve to hold the brackets $d$ on the inner rim $c$. The ends $z$ of spring rods $m$ are mounted in the ends of the brackets $d$ there being preferably two of the rods $m$ to each of the brackets. Intermediate their ends, the spring rods $m$ are bent upon themselves to form loop-shaped lugs $k$ which extend circumferentially of the wheel. Between the lugs $k$ and the ends $z$ of the rods $m$ the rods are bent upon themselves to form resilient convolutions $e$ which project toward the hub $r$.

The invention comprises an outer rim $a$ supporting a tire $b$, the latter preferably being solid, since one object of the invention is to dispense with pneumatic tires and like elements subject to puncture and deterioration. At intervals, the outer rim $a$ is equipped with bosses $n$ having transverse main seats $f$ into which open auxiliary seats $i$ prolonged circumferentially of the wheel in opposite directions. In the bosses $n$ are formed openings $p$.

The spring rods $m$ fit in the main seats $f$ the loop-shaped lugs $k$ being received in the auxiliary seats $i$. Superposed upon the spring rods $m$ are caps $g$ having openings $h$ adapted to receive securing elements $q$, entering the openings $p$ in the bosses $n$ on the outer rim $a$.

Owing to the peculiar manner in which the spring rods $m$ are interlocked at $k$ with the auxiliary seats $i$ on the outer rim $a$, and owing to the function exercised by the cap $g$, the spring rods $m$ and the brackets $d$ may be held securely to the outer rim $a$, the convolutions $e$ affording the necessary resiliency.

Having thus described the invention, what is claimed is:—

In a device of the class described, an inner rim; an arched bracket disposed transversely of the inner rim and secured thereto; a spring rod connecting the ends of the bracket, the rod being provided intermediate its ends with a circumferentially extended lug, and being provided upon each side of the lug with resilient convolutions; an outer rim embodying a transverse seat receiving the rod, there being an auxiliary circumferential seat opening into the main seat and receiving the lug; a cap superposed upon the rod, between the convolutions; and means for securing the cap to the outer rim.

In testimony that we claim the foregoing as our own, we have hereto affixed our signatures in the presence of two witnesses.

SAMUEL T. SHEPPARD.
ARCHIBALD MUNRO.

Witnesses:
C. O. DAILEY,
DORA W. DAILEY.